(12) United States Patent
Kimura et al.

(10) Patent No.: US 8,423,245 B2
(45) Date of Patent: Apr. 16, 2013

(54) ELECTRIC POWER STEERING CONTROL APPARATUS

(75) Inventors: Kazushi Kimura, Kobe (JP); Takayuki Yamamoto, Tokyo (JP); Ryuuji Okamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1232 days.

(21) Appl. No.: 11/850,995

(22) Filed: Sep. 6, 2007

(65) Prior Publication Data

US 2008/0228354 A1    Sep. 18, 2008

(30) Foreign Application Priority Data

Mar. 12, 2007    (JP) ................................. 2007-061855

(51) Int. Cl.
     *A01B 69/00*      (2006.01)
     *B62D 6/00*      (2006.01)

(52) U.S. Cl.
     USPC ................... 701/41; 701/42; 701/43; 701/44; 701/1

(58) Field of Classification Search ........................ None
See application file for complete search history.

(56) References Cited

U.S. PATENT DOCUMENTS

| | | | | |
|---|---|---|---|---|
| 4,715,461 A * | 12/1987 | Shimizu | .......................... | 180/446 |
| 4,753,310 A * | 6/1988 | Hashimoto | .................... | 180/446 |
| 4,819,170 A * | 4/1989 | Shimizu | ........................... | 701/41 |
| 4,828,065 A * | 5/1989 | Ishihara et al. | ................ | 180/422 |
| 4,951,199 A * | 8/1990 | Whitehead | ........................ | 701/41 |
| 5,029,660 A * | 7/1991 | Raad et al. | ..................... | 180/422 |
| 5,076,381 A * | 12/1991 | Daido et al. | ................... | 180/446 |
| 5,202,830 A * | 4/1993 | Tsurumiya et al. | .............. | 701/41 |
| 5,257,828 A * | 11/1993 | Miller et al. | ................... | 180/446 |
| 5,307,892 A * | 5/1994 | Phillips | .......................... | 180/422 |
| 5,404,961 A * | 4/1995 | Huber | ............................ | 180/417 |
| 5,448,482 A * | 9/1995 | Yamamoto et al. | .............. | 701/41 |
| 5,467,279 A * | 11/1995 | Wada et al. | ...................... | 701/42 |
| 5,473,231 A * | 12/1995 | McLaughlin et al. | ......... | 318/433 |
| 5,544,715 A * | 8/1996 | Phillips | .......................... | 180/417 |

(Continued)

FOREIGN PATENT DOCUMENTS

| | | |
|---|---|---|
| DE | 69930820 T2 | 11/2006 |
| JP | 3712876 B2 | 6/2000 |
| JP | 2000-168600 A | 5/2006 |

OTHER PUBLICATIONS

Japanese Office Action dated Feb. 13, 2009.

*Primary Examiner* — Khoi Tran
*Assistant Examiner* — Bhavesh V Amin
(74) *Attorney, Agent, or Firm* — Sughrue Mion, PLLC

(57) ABSTRACT

An electric power steering control apparatus can reduce steering torque even in a steering holding state or a slight steering state without providing an unpleasant feeling to a driver. The apparatus includes a torque sensor for detecting steering torque generated by the driver for a vehicle, a motor for generating assist torque to assist the steering torque, a rotational speed detector for detecting the rotational speed of the motor, a torque controller for calculating an assist torque current corresponding to the assist torque based on the steering torque, and a damping control section for calculating a damping current to be added to the assist torque current to suppress vibrations generated in a steering system of the vehicle. The damping controller reduces a damping control gain to calculate the damping current when the rotational speed of the motor is equal to or less than a predetermined speed.

8 Claims, 11 Drawing Sheets

U.S. PATENT DOCUMENTS

| | | | | |
|---|---|---|---|---|
| 5,568,389 A * | 10/1996 | McLaughlin et al. | ........... | 701/41 |
| 5,603,391 A * | 2/1997 | Class et al. | ................... | 188/266 |
| 5,719,766 A * | 2/1998 | Bolourchi et al. | ............... | 701/42 |
| 5,919,241 A * | 7/1999 | Bolourchi et al. | ............... | 701/41 |
| 5,979,587 A * | 11/1999 | Liubakka et al. | ............. | 180/446 |
| 5,998,952 A * | 12/1999 | McLaughlin et al. | ........ | 318/432 |
| 6,046,560 A * | 4/2000 | Lu et al. | ......................... | 318/432 |
| 6,129,172 A * | 10/2000 | Yoshida et al. | ............... | 180/446 |
| 6,148,951 A * | 11/2000 | Nishi et al. | .................... | 180/446 |
| 6,152,254 A * | 11/2000 | Phillips | ......................... | 180/422 |
| 6,360,151 B1 * | 3/2002 | Suzuki et al. | ................... | 701/41 |
| 6,422,335 B1 * | 7/2002 | Miller | ........................... | 180/446 |
| 6,491,313 B1 * | 12/2002 | Rui et al. | ....................... | 280/90 |
| 6,505,703 B2 * | 1/2003 | Stout et al. | .................... | 180/446 |
| 6,533,666 B2 * | 3/2003 | Garcia et al. | ..................... | 464/75 |
| 6,631,781 B2 * | 10/2003 | Williams et al. | .............. | 180/443 |
| 6,634,454 B2 * | 10/2003 | Sugitani et al. | ............... | 180/402 |
| 6,658,335 B2 * | 12/2003 | Kleinau | ........................... | 701/41 |
| 6,681,883 B2 * | 1/2004 | Loh et al. | ....................... | 180/417 |
| 6,718,243 B1 * | 4/2004 | Yao et al. | ........................ | 701/42 |
| 6,862,507 B2 * | 3/2005 | Altemare, Jr. et al. | ........... | 701/41 |
| 6,929,085 B2 * | 8/2005 | Sugitani | ........................ | 180/402 |
| 7,188,701 B2 * | 3/2007 | Patankar | ....................... | 180/446 |
| 7,246,679 B2 * | 7/2007 | Kasahara et al. | ............. | 180/402 |
| 7,523,806 B2 * | 4/2009 | Krieger et al. | ................ | 180/446 |
| 2002/0142850 A1 * | 10/2002 | Garcia et al. | .................... | 464/180 |
| 2002/0173891 A1 * | 11/2002 | Kimura et al. | .................. | 701/41 |
| 2008/0228354 A1 * | 9/2008 | Kimura et al. | .................. | 701/42 |

* cited by examiner

ELECTRIC POWER STEERING CONTROL APPARATUS

BACKGROUND OF THE INVENTION

1. Field of the Invention

The present invention relates to an electric power steering control apparatus that generates assist torque for assisting steering torque of a driver by means of a motor.

2. Description of the Related Art

In general, an electric power steering control apparatus includes a steering torque detector for detecting steering torque generated by a driver, a phase compensator for improving the frequency characteristic of the steering torque, a torque controller for calculating an assist torque current for assistance of the steering torque based thereon, and a motor for generating an assist torque to assist the steering torque of the driver in accordance with the assist torque current.

In this case, the assist torque current calculated by the torque controller is a value substantially proportional to the steering torque from the steering torque detector of which the frequency characteristic is improved by the phase compensator. In addition, the greater a torque proportional gain set in the torque controller, the greater the assist torque current and the assist torque become, so the driver's steering torque is accordingly reduced.

If the torque proportional gain is set large, however, there occurs oscillation of a steering system, and vibration of a steering wheel becomes liable to occur, thus posing a problem of providing an unpleasant feeling to the driver.

Accordingly, in order to solve the above problem, a conventional electric power steering control apparatus includes a rotational speed sensor for detecting the rotational speed of a motor, a rotational speed high-pass filter (hereinafter abbreviated as a rotational speed "HPF") for removing a speed component due to steering from the detected rotational speed of the motor, and a damping controller for calculating a damping current based on an output of the rotational speed HPF (see, for example, a first patent document: Japanese patent No. 3,712,876).

Here, by calculating the damping current based on the output of the rotational speed HPF, the vibration of the steering wheel is suppressed to reduce the steering torque without providing any unpleasant feeling to the driver.

In such a conventional electric power steering control apparatus, the damping current is calculated based on the output of the rotational speed HPF regardless of the steering state, and damping control for suppressing vibrations generated in the steering system is executed.

As a result, there has been a problem that in a state of holding the steering wheel (i.e., a state where the rotational speed of the motor is zero, and hereinafter being referred to as a "steering holding state"), or in a state of steering the steering wheel to a slight extent (i.e., a state where the rotational speed of the motor is low, and hereinafter being referred to as a "slight steering state"), the damping control becomes overcompensation, causing vibration of the steering wheel and providing an unpleasant feeling to the driver.

SUMMARY OF THE INVENTION

Accordingly, the present invention is intended to obviate the problems as referred to above, and has for its object to provide an electric power steering control apparatus which is capable of reducing the steering torque required of a driver without providing an unpleasant feeling to the driver by suppressing vibration of a steering wheel even in a steering holding state or in a slight steering state.

Bearing the above object in mind, an electric power steering control apparatus according to the present invention includes a steering torque detection section that detects steering torque generated by a driver of a vehicle; a motor that generates assist torque to assist the steering torque; a rotational speed detection section that detects the rotational speed of the motor; a torque control section that calculates an assist torque current corresponding to the assist torque based on the steering torque; and a damping control section that calculates a damping current to be added to the assist torque current for suppressing vibrations generated in a steering system of the vehicle. The damping control section reduces a damping control gain for calculation of the damping current when the rotational speed of the motor is equal to or less than a predetermined speed.

According to the electric power steering control apparatus of the present invention, the damping control section calculates the damping current with the damping control gain appropriately reduced when the rotational speed of the motor is equal to or less than the predetermined speed.

Accordingly, an overcompensation of the damping control can be prevented and vibration of the steering wheel is suppressed, whereby it is possible to reduce the steering torque required of a driver without providing an unpleasant feeling to the driver even in a steering holding state or in a slight steering state.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Figure 1:
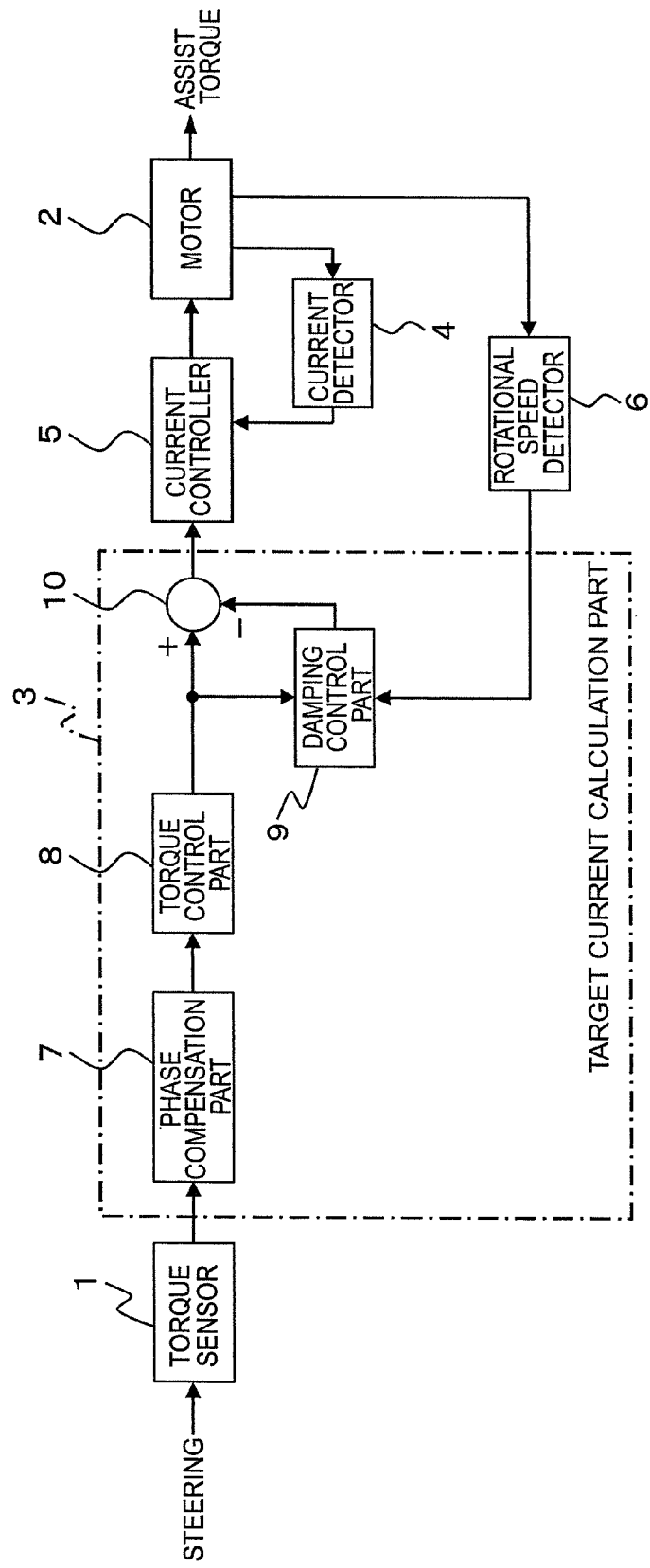
FIG. 1 is a block diagram showing an electric power steering control apparatus according to a first embodiment of the present invention.

Now, preferred embodiments of the present invention will be described in detail while referring to the accompanying drawings. Throughout respective figures, the same or corresponding members or parts are identified by the same reference numerals and characters.

Embodiment 1

Referring to the drawings and first to FIG. 1, there is shown, in a block diagram, an electric power steering control apparatus according to a first embodiment of the present invention.

In FIG. 1, the electric power steering control apparatus includes a torque sensor 1 (a steering torque detection section), a motor 2, a target current calculation part 3, a current detector 4 (a current detection section), a current controller 5 (a voltage calculation section), and a rotational speed detector 6 (a rotational speed detection section).

The torque sensor 1 detects a steering torque generated by steering of a driver for a vehicle, and outputs a corresponding steering torque signal. The motor 2 generates an assist torque to assist the steering torque.

The target current calculation part 3 takes in the steering torque signal, etc., converts it from analog into digital form, calculates therefrom a target motor current to be supplied to the motor 2, and outputs a target motor current signal. The current detector 4 detects a motor drive current supplied to the motor 2, and outputs a corresponding motor drive current signal.

The current controller 5 compares the target motor current signal and the motor drive current signal with each other, calculates a target motor voltage to be impressed to a terminal of the motor 2 so as to make the motor drive current coincide with the target motor current, and outputs a target motor voltage signal as a PWM (pulse width modulation) signal for example.

The rotational speed detector 6 detects the rotational speed of the motor 2, and outputs a corresponding rotational speed signal (a detected value).

The target current calculation part 3 includes a phase compensation part 7, a torque control part 8 (a torque control section), a damping control part 9 (a damping control section), and an addition part 10 (an addition section).

Here, the target current calculation part 3 is constituted by a microprocessor (not shown) that has a CPU for executing calculation processing, a ROM for storing program data and fixed value data, and a RAM for storing rewritable data. Individual blocks constituting the target current calculation part 3 are stored in the ROM as software.

The phase compensation part 7 phase compensates the steering torque signal to improve the frequency characteristic thereof, and outputs a post-compensation steering torque signal.

The torque control part 8 calculates, based on the post-compensation steering torque signal, an assist torque current corresponding to the assist torque generated by the motor 2, and outputs a corresponding assist torque current signal.

That is, the torque control part 8 has a steering torque-assist torque current map stored in the ROM, with the relation between the steering torque and the assist torque current being described in the map. The torque control part 8 calculates the assist torque current from this map based on the post-compensation steering torque signal.

The damping control part 9 calculates, based on the assist torque current signal and the rotational speed signal, a damping current for suppressing vibrations generated in a steering system of the vehicle, and outputs a corresponding damping current signal.

That is, the damping control part 9 has an assist torque current-vibration suppression current map and a rotational speed-damping control gain map stored in the ROM, wherein the assist torque current-vibration suppression current map describes therein the relation between the assist torque current and a vibration suppression current for suppressing the above vibrations, and the rotational speed-damping control gain map describes therein the relation between the rotational speed of the motor 2 and a damping control gain for calculating the damping current.

The damping control part 9 calculates the vibration suppression current from the assist torque current-vibration suppression current map based on the assist torque current signal, sets the damping control gain from the rotational speed-damping control gain map based on the rotational speed signal, and calculates the damping current by multiplying the vibration suppression current by the damping control gain.

Here, note that the damping control section 9 reduces the damping control gain appropriately when the rotational speed of the motor 2 is equal to or less than a predetermined speed.

Figure 2:
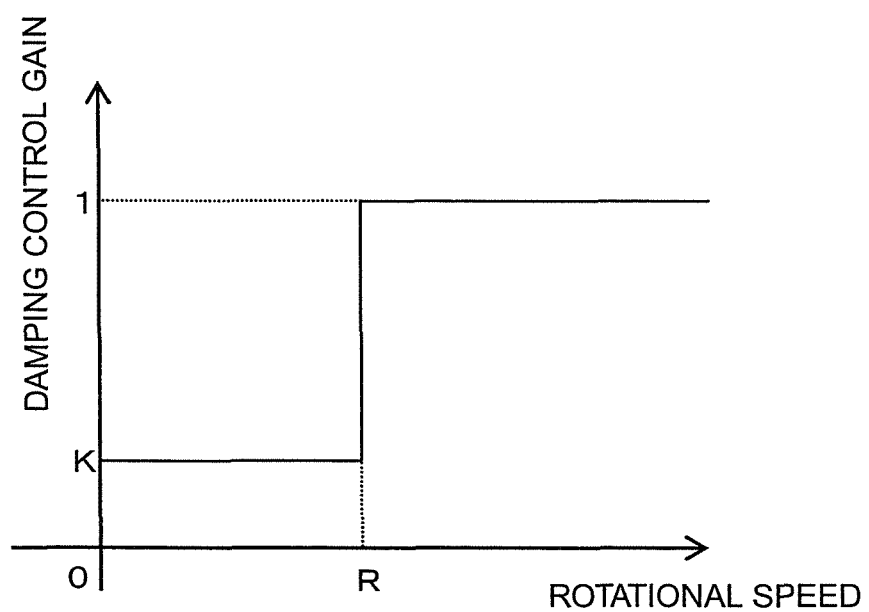
FIG. 2 is an explanatory view showing a rotational speed-damping control gain map provided in a damping control part in FIG. 1.

FIG. 2 is an explanatory view that shows the rotational speed-damping control gain map provided in the damping control part 9.

In FIG. 2, when the rotational speed of the motor 2 is larger than a predetermined speed R, the damping control gain is set to "1", whereas when the rotational speed of the motor 2 is equal to or less than the predetermined speed R, the damping control gain is set to a predetermined gain K (<1).

As a result, the damping control can be executed only when necessary, and an overcompensation of the damping control can be prevented.

The addition part 10 calculates the target motor current to be supplied to the motor 2 by adding the assist torque current signal and subtracting the damping current signal, and outputs a corresponding target motor current signal.

Hereinafter, reference will be made to the operation of the target current calculation part 3 in the electric power steering control apparatus as constructed above while referring to a flow chart in FIG. 3.

First of all, the target current calculation part 3 reads in a steering torque signal from the torque sensor 1 in each predetermined sampling period, and stores it in the RAM (step S31).

Also, the target current calculation part 3 reads in a rotational speed signal from the rotational speed detector 6, and stores it in the RAM (step S32).

Subsequently, the phase compensation part 7 phase compensates the steering torque signal to improve the frequency characteristic thereof, and stores a corresponding post-compensation steering torque signal in the RAM (step S33).

Then, the torque control part 8 calculates an assist torque current from the above-mentioned steering torque-assist torque current map based on the post-compensation steering torque signal, and stores a corresponding assist torque current signal in the RAM (step S34).

Subsequently, the damping control part 9 calculates a vibration suppression current from the above-mentioned assist torque current-vibration suppression current map based on the assist torque current signal (step S35).

Thereafter, the damping control part 9 determines, based on the rotational speed signal, whether the rotational speed of the motor 2 is less than or equal to the predetermined speed R (i.e., whether the steering wheel is in the steering holding state or in the slight steering state) (step S36).

When it is determined in step S36 that the rotational speed of the motor 2 is less than or equal to the predetermined speed R (that is, Yes), the damping control part 9 reduces the damping control gain in accordance with the rotational speed-damping control gain map shown in FIG. 2, as stated above (step S37).

Subsequently, the damping control part 9 calculates a damping current by multiplying the vibration suppression current by the damping control gain (here, the predetermined gain K), and stores a corresponding damping current signal in the RAM (step S38).

On the other hand, when it is determined in step S36 that the rotational speed of the motor 2 is larger than the predetermined speed R (that is, No), the damping control part 9 calculates a damping current by multiplying the vibration suppression current by the damping control gain (here, "1"), and stores a corresponding damping current signal in the RAM (step S38).

Figure 3:
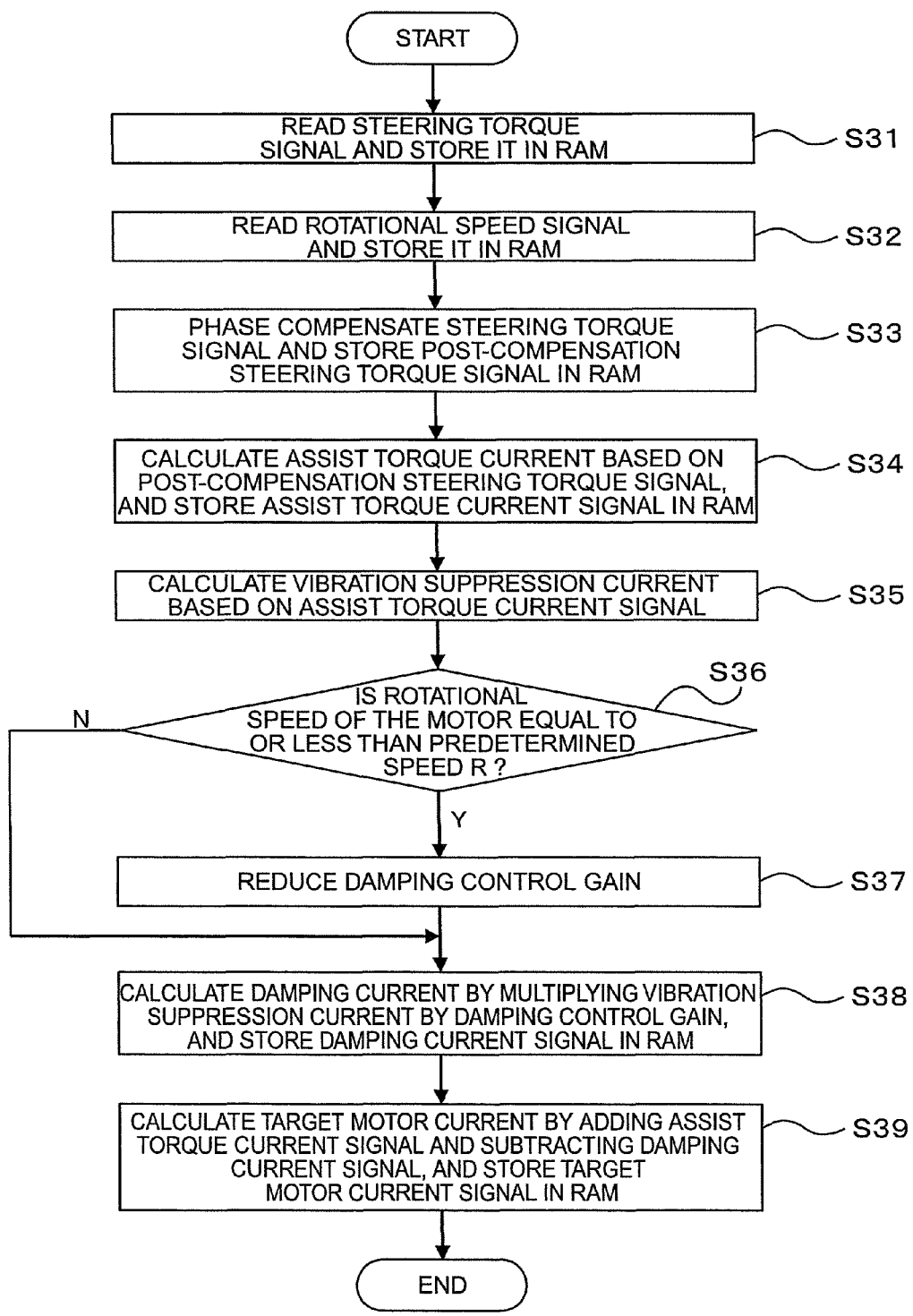
FIG. 3 is a flow chart illustrating the operation of a target current calculation part according to the first embodiment of the present invention.

Then, the addition part 10 calculates a target motor current to be supplied to the motor 2 by adding the assist torque current signal and subtracting the damping current signal, and stores a corresponding target motor current signal in the RAM, after which the processing of FIG. 3 is terminated.

According to the electric power steering control apparatus of this first embodiment of the present invention, the damping control section 9 calculates the damping current by reducing the damping control gain to the predetermined gain K (<1) when the rotational speed of the motor 2 is equal to or less than the predetermined speed R.

Accordingly, the overcompensation of the damping control can be prevented and vibration of the steering wheel is suppressed, whereby the steering torque required of the driver can be reduced without providing an unpleasant feeling to the driver even in the steering holding state or in the slight steering state.

Embodiment 2

Figure 4:
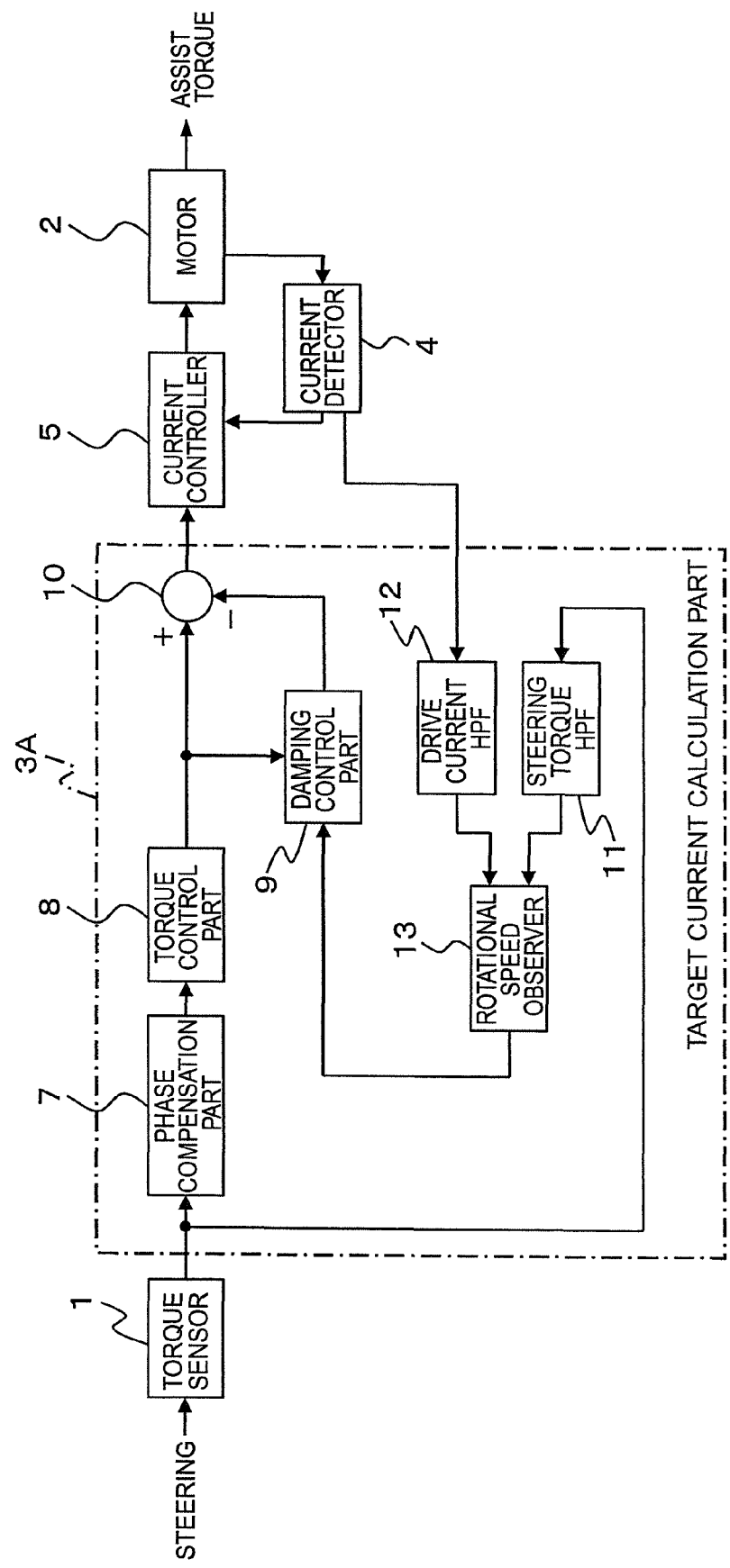
FIG. 4 is a block diagram showing an electric power steering control apparatus according to a second embodiment of the present invention.

FIG. 4 is a block diagram that shows an electric power steering control apparatus according to a second embodiment of the present invention.

In FIG. 4, this electric power steering control apparatus includes, in place of the rotational speed detector 6 shown in FIG. 1, a steering torque high-pass filter 11 (a steering torque steering component removal section) (hereinafter abbreviated as a "steering torque HPF 11"), a drive current high-pass filter 12 (a steering current steering component removal section) (hereinafter abbreviated as a "drive current HPF 12"), and a rotational speed observer 13.

Here, note that a target current calculation part 3A includes the steering torque HPF 11, the drive current HPF 12, and the rotational speed observer 13.

The steering torque HPF 11 removes a frequency component due to the steering operation of the driver from a steering torque signal, and outputs a post-removal steering torque signal (post-removal steering torque). The drive current HPF 12 removes a frequency component due to the steering operation of the driver from the motor drive current signal, and outputs a post-removal motor drive current signal (a post-removal motor current).

The rotational speed observer 13 has a vibration equation incorporated therein which has the moment of inertia of the motor 2 as an inertia term, and the rigidity of the torque sensor 1 as a spring term. The rotational speed observer 13 estimates the rotational speed of the motor 2 based on the post-removal steering torque signal and the post-removal motor drive current signal, and outputs a rotational speed signal (estimated value).

The construction of this second embodiment other than the above is similar to that of the first embodiment, and a description thereof is omitted.

Here, reference will be made to the operations of the steering torque HPF 11 and the drive current HPF 12.

In general, it is assumed that the frequency due to the steering of a driver is about 3 Hz or below. For example, when a lane change is made by a driver, the frequency of vibration due to the steering of a driver is 0.2 Hz or therearound, and a lot of steering operations of such low frequencies are usually performed. In contrast to this, the frequency band in which the vibration of the steering system is liable to be generated is assumed to be 30 Hz or more.

Accordingly, a frequency due to the steering of the driver and a frequency in which the vibration of the steering system is liable to be generated can be separated from each other in an easy manner.

Thus, by using the steering torque HPF 11 and the drive current HPF 12, the frequency component due to the steering of the driver can be removed from the steering torque signal and the motor drive current signal, respectively, whereby it is possible to prevent the frequency component due to the steering of the driver from superposing on the rotational speed of the motor 2 estimated by the rotational speed observer 13.

Figure 5:
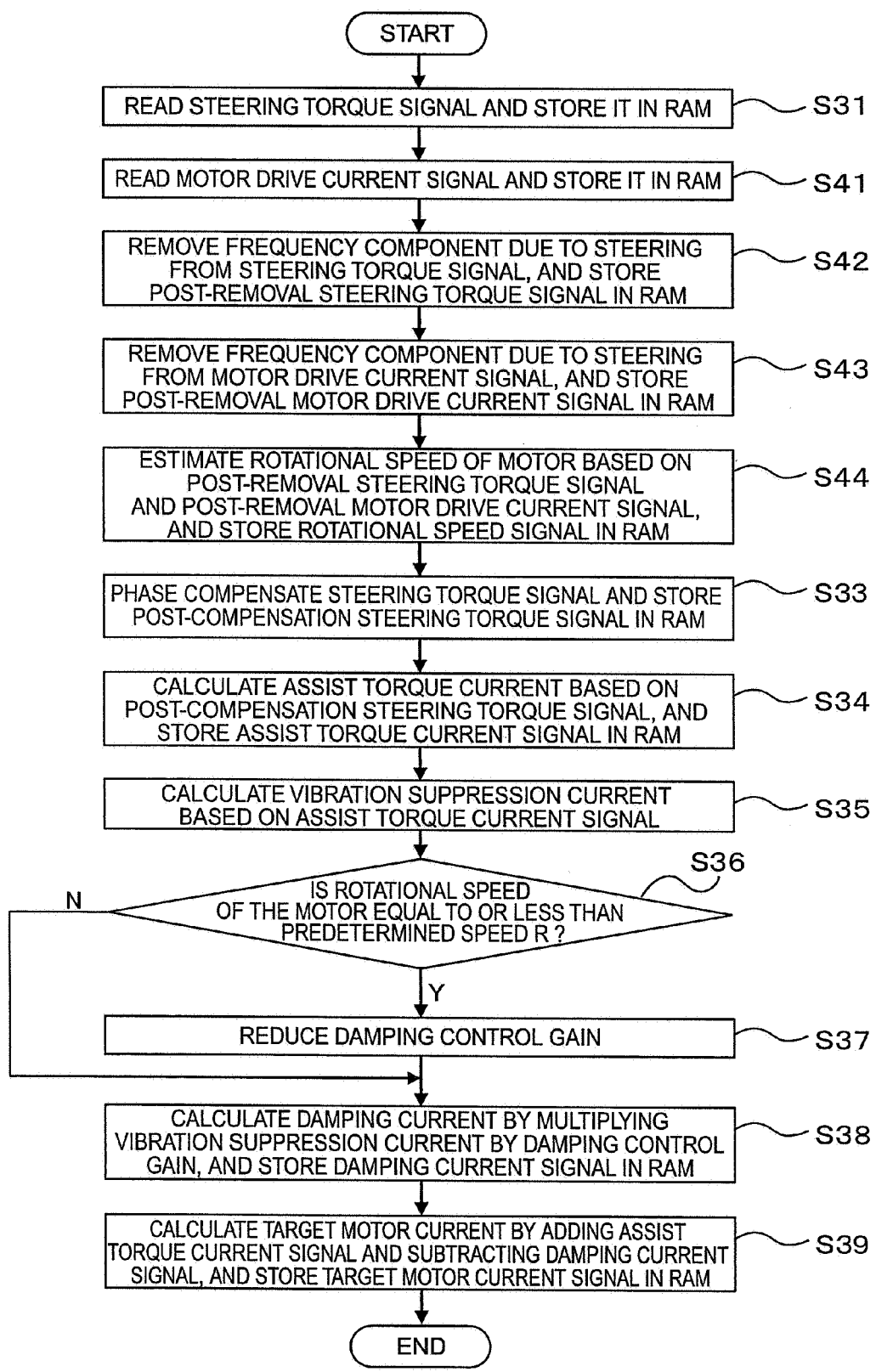
FIG. 5 is a flow chart illustrating the operation of a target current calculation part according to the second embodiment of the present invention.

Hereinafter, reference will be made to the operation of the target current calculation part 3A in the electric power steering control apparatus as constructed above while referring to a flow chart in FIG. 5.

First of all, the target current calculation part 3A reads in a steering torque signal from the torque sensor 1 in each predetermined sampling period, and stores it in the RAM (step S31).

Also, the target current calculation part 3A reads in a motor drive current signal from the current detector 4, and stores it in the RAM (step S41).

Subsequently, the steering torque HPF 11 removes a frequency component due to the steering operation of the driver from the steering torque signal, and stores a corresponding post-removal steering torque signal in the RAM (step S42).

Also, the drive current HPF 12 removes the frequency component due to the steering operation of the driver from the motor drive current signal, and stores a corresponding post-removal motor drive current signal in the RAM (step S43).

Then, the rotational speed observer 13 estimates the rotational speed of the motor 2 based on the post-removal steering torque signal and the post-removal motor drive current signal, and stores a corresponding rotational speed signal in the RAM (step S44).

Subsequently, the phase compensation part 7 phase compensates the steering torque signal to improve the frequency characteristic thereof, and stores a post-compensation steering torque signal in the RAM (step S33).

Here, note that the operation of this second embodiment other than the above is similar to that of the above-mentioned first embodiment, and a description thereof is omitted.

According to the electric power steering control apparatus of this second embodiment of the present invention, the rotational speed observer 13 estimates the rotational speed of the motor 2 based on the post-removal steering torque signal from the steering torque HPF 11 and the post-removal motor drive current signal from the drive current HPF 12, and the damping control section 9 calculates a damping current by reducing a damping control gain to a predetermined gain K (<1) when the rotational speed of the motor 2 is equal to or less than a predetermined speed R.

Accordingly, advantageous effects similar to those in the above-mentioned first embodiment can be obtained, and the rotational speed detector 6 for detecting the rotational speed of the motor 2 is not needed, so cost reduction can be achieved.

Here, note that the rotational speed observer 13 of the above-mentioned second embodiment estimates the rotational speed of the motor 2 based on the post-removal motor drive current signal which is obtained by removing the frequency component due to the steering operation of the driver from the motor drive current signal (the output of the current detector 4), but the present invention is not limited to this.

The rotational speed observer 13 may estimate the rotational speed of the motor 2 based on a post-removal target motor current signal (a post-removal motor current) which is obtained by removing the frequency component due to the steering operation of the driver from a target motor current signal (an output of the target current calculation part 3A).

In this case, too, the advantageous effects similar to those of the above-mentioned second embodiment can be achieved.

Embodiment 3

Figure 6:
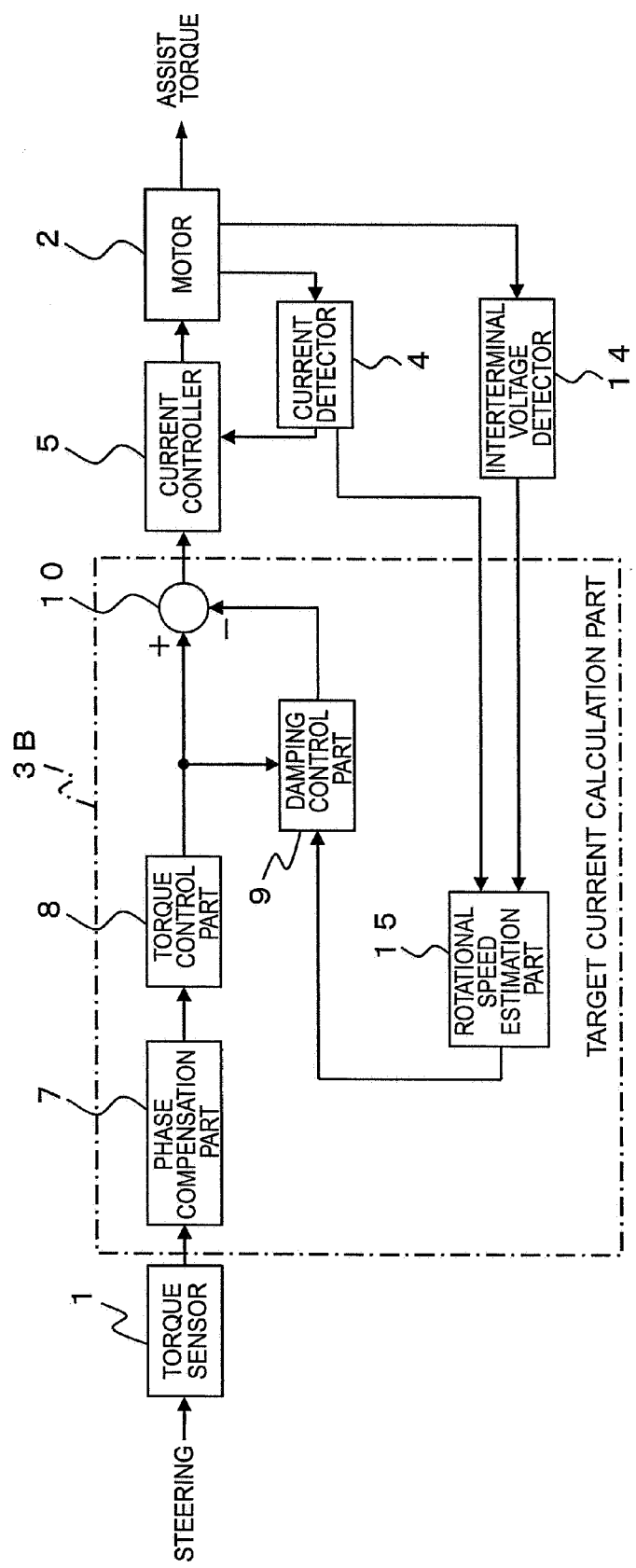
FIG. 6 is a block diagram showing an electric power steering control apparatus according to a third embodiment of the present invention.

FIG. 6 is a block diagram that shows an electric power steering control apparatus according to a third embodiment of the present invention.

In FIG. 6, this electric power steering control apparatus includes, in place of the rotational speed detector 6 shown in FIG. 1, an interterminal voltage detector 14 (a voltage detection section), and a rotational speed estimation part 15 (a rotational speed estimation section).

Here, note that a target current calculation part 3B includes the rotational speed estimation part 15.

The interterminal voltage detector 14 detects a motor drive voltage impressed to the terminal of the motor 2, and outputs a corresponding motor drive voltage signal. The rotational speed estimation part 15 estimates the rotational speed of the motor 2 based on a motor drive current signal from the current detector 4 and the motor drive voltage signal, and outputs a corresponding rotational speed signal (estimated value).

The construction of this third embodiment other than the above is similar to that of the first embodiment, and a description thereof is omitted.

Figure 7:
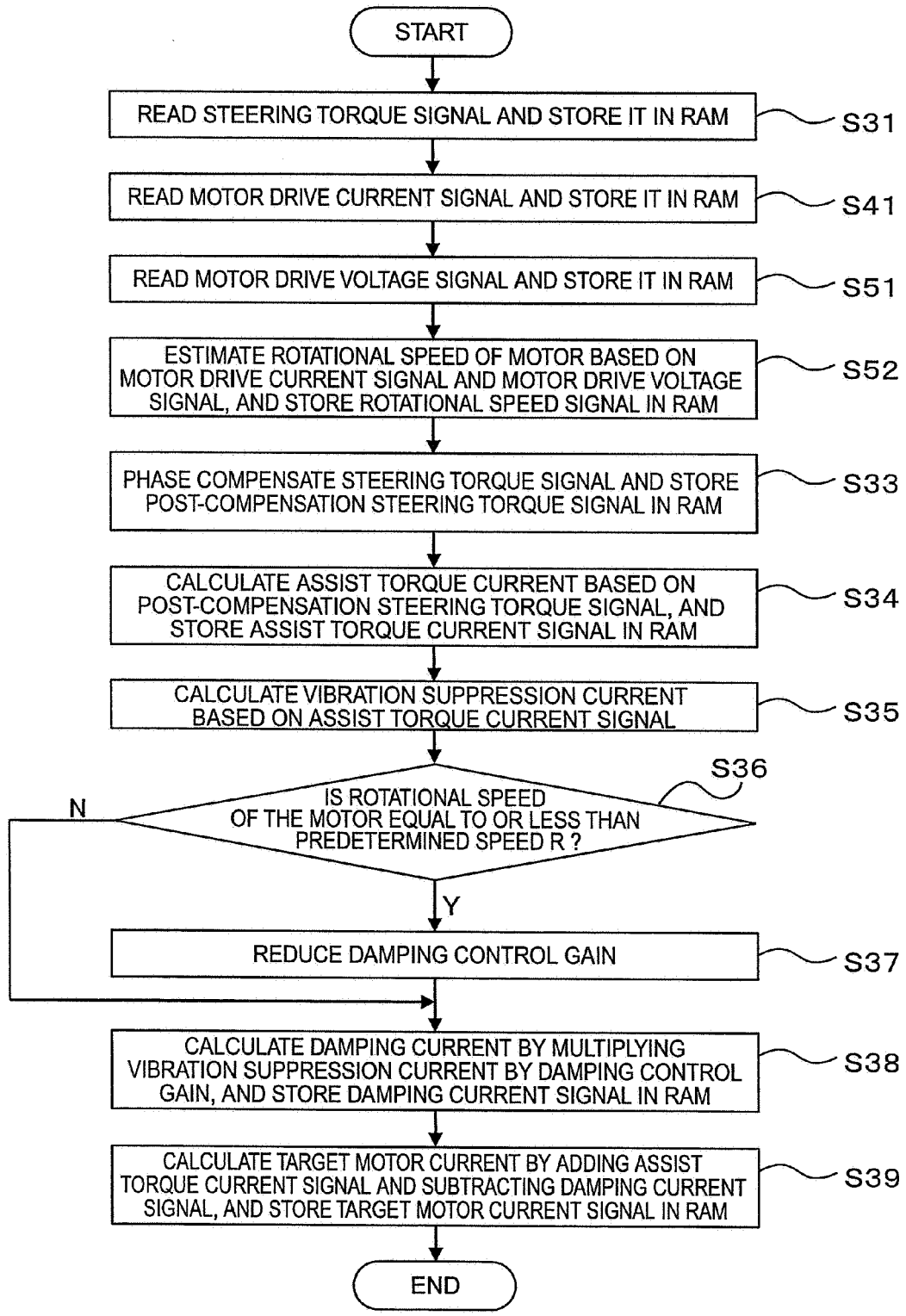
FIG. 7 is a flow chart illustrating the operation of a target current calculation part according to the third embodiment of the present invention.

Hereinafter, reference will be made to the operation of the target current calculation part 3B in the electric power steering control apparatus as constructed above while referring to a flow chart in FIG. 7.

First of all, the target current calculation part 3B reads in a steering torque signal from the torque sensor 1 in each predetermined sampling period, and stores it in the RAM (step S31).

Also, the target current calculation part 3B reads in a motor drive current signal from the current detector 4, and stores it in the RAM (step S41). Subsequently, the target current calculation part 3B reads in a motor drive voltage signal from the interterminal voltage detector 14, and stores it in the RAM (step S51).

Then, the rotational speed estimation part 15 estimates the rotational speed of the motor 2 based on the motor drive current signal and the motor drive voltage signal, and stores a corresponding rotational speed signal in the RAM (step S52).

Subsequently, the phase compensation part 7 phase compensates the steering torque signal to improve the frequency characteristic thereof, and stores a corresponding post-compensation steering torque signal in the RAM (step S33).

Here, note that the operation of this third embodiment other than the above is similar to that of the above-mentioned first embodiment, and a description thereof is omitted.

According to the electric power steering control apparatus of this third embodiment of the present invention, the rotational speed estimation part 15 estimates the rotational speed of the motor 2 based on the motor drive current signal from the current detector 4 and the motor drive voltage signal from the interterminal voltage detector 14, and the damping control section 9 calculates a damping current by reducing a damping control gain to a predetermined gain K (<1) when the rotational speed of the motor 2 is equal to or less than a predetermined speed R.

Accordingly, advantageous effects similar to those in the above-mentioned first embodiment can be obtained, and the rotational speed detector 6 for detecting the rotational speed of the motor 2 is not needed, so cost reduction can be achieved.

Here, note that the rotational speed estimation part 15 of the above-mentioned third embodiment estimates the rotational speed of the motor 2 based on the motor drive current signal from the current detector 4 and the motor drive voltage signal from the interterminal voltage detector 14, but the present invention is not limited to this.

The rotational speed estimation part 15 may estimate the rotational speed of the motor 2 based on a target motor current signal from the target current calculation part 3B and the motor drive current signal from the current detector 4. Also, the rotational speed estimation part 15 may estimate the rotational speed of the motor 2 based on a target motor voltage signal from the current controller 5 and the motor drive current signal from the current detector 4.

In these cases, advantageous effects similar to those of the above-mentioned third embodiment can be achieved.

Embodiment 4

Figure 8:
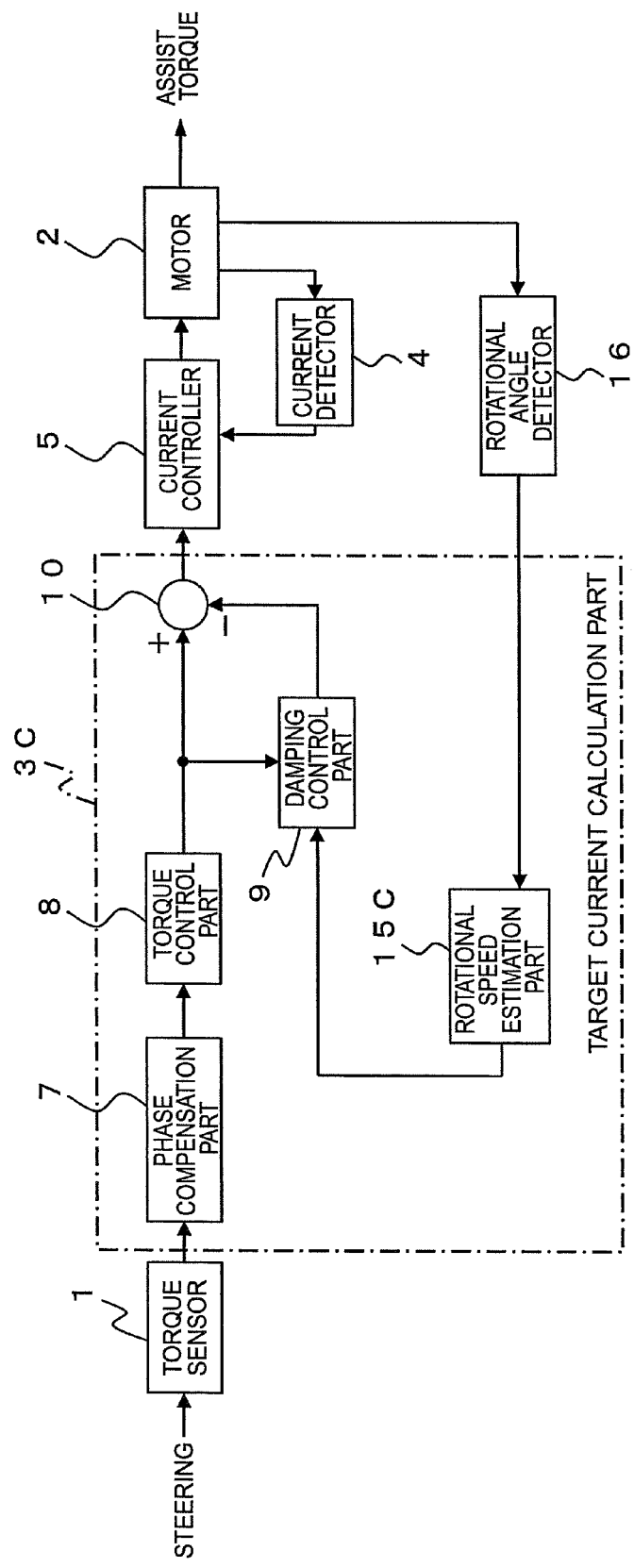
FIG. 8 is a block diagram showing an electric power steering control apparatus according to a fourth embodiment of the present invention.

FIG. 8 is a block diagram that shows an electric power steering control apparatus according to a fourth embodiment of the present invention.

In FIG. 8, this electric power steering control apparatus includes, in place of the rotational speed detector 6 shown in FIG. 1, a rotational angle detector 16 (a rotational angle detection section), and a rotational speed estimation part 15C (a rotational speed estimation section).

Here, note that a target current calculation part 3C includes the rotational speed estimation part 15C.

The rotational angle detector 16 detects the rotational angle of the motor 2, and outputs a corresponding rotational angle signal. The rotational speed estimation part 15C estimates the rotational speed of the motor 2 based on the rotational angle signal, and outputs a corresponding rotational speed signal (estimated value).

The construction of this fourth embodiment other than the above is similar to that of the first embodiment, and a description thereof is omitted.

Figure 9:
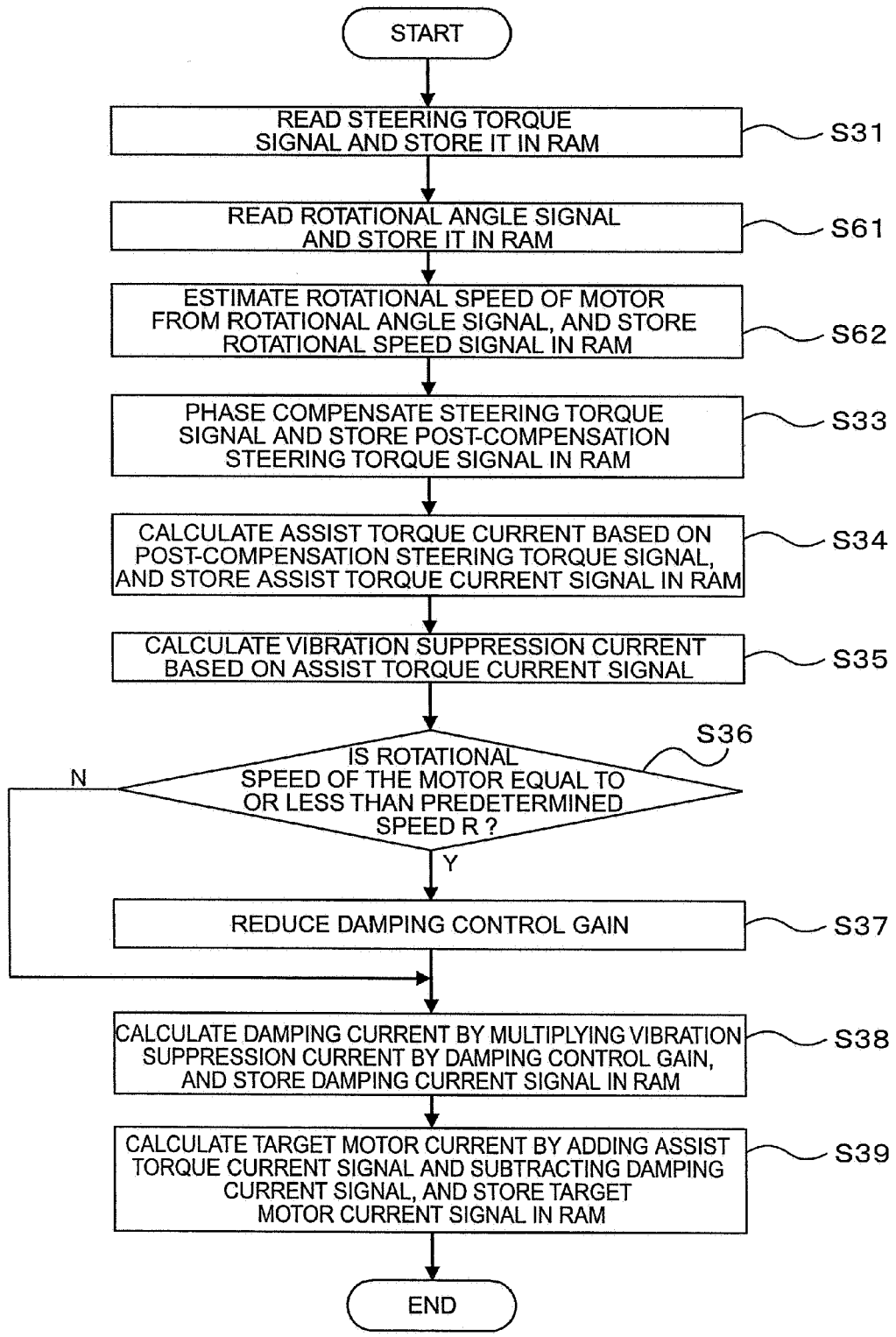
FIG. 9 is a flow chart illustrating the operation of a target current calculation part according to the fourth embodiment of the present invention.

Hereinafter, reference will be made to the operation of the target current calculation part 3C in the electric power steering control apparatus as constructed above while referring to a flow chart in FIG. 9.

First of all, the target current calculation part 3C reads in a steering torque signal from the torque sensor 1 in each predetermined sampling period, and stores it in the RAM (step S31).

Also, the target current calculation part 3C reads in a rotational angle signal from the rotational angle detector 16, and stores it in the RAM (step S61).

Then, the rotational speed estimation part 15C estimates the rotational speed of the motor 2 based on the rotational angle signal, and stores a corresponding rotational speed signal in the RAM (step S62).

Subsequently, the phase compensation part 7 phase compensates the steering torque signal to improve the frequency characteristic thereof, and stores a corresponding post-compensation steering torque signal in the RAM (step S33).

Here, note that the operation of this fourth embodiment other than the above is similar to that of the above-mentioned first embodiment, and a description thereof is omitted.

According to the electric power steering control apparatus of the fourth embodiment of the present invention, the rotational speed estimation part 15C estimates the rotational speed of the motor 2 based on the rotational angle signal from the rotational angle detector 16, and the damping control section 9 calculates a damping current by reducing a damping control gain to a predetermined gain K (<1) when the rotational speed of the motor 2 is equal to or less than a predetermined speed R.

Accordingly, advantageous effects similar to those in the above-mentioned first embodiment can be obtained, and the rotational speed detector 6 for detecting the rotational speed of the motor 2 is not needed, so cost reduction can be achieved.

Embodiment 5

Figure 10:
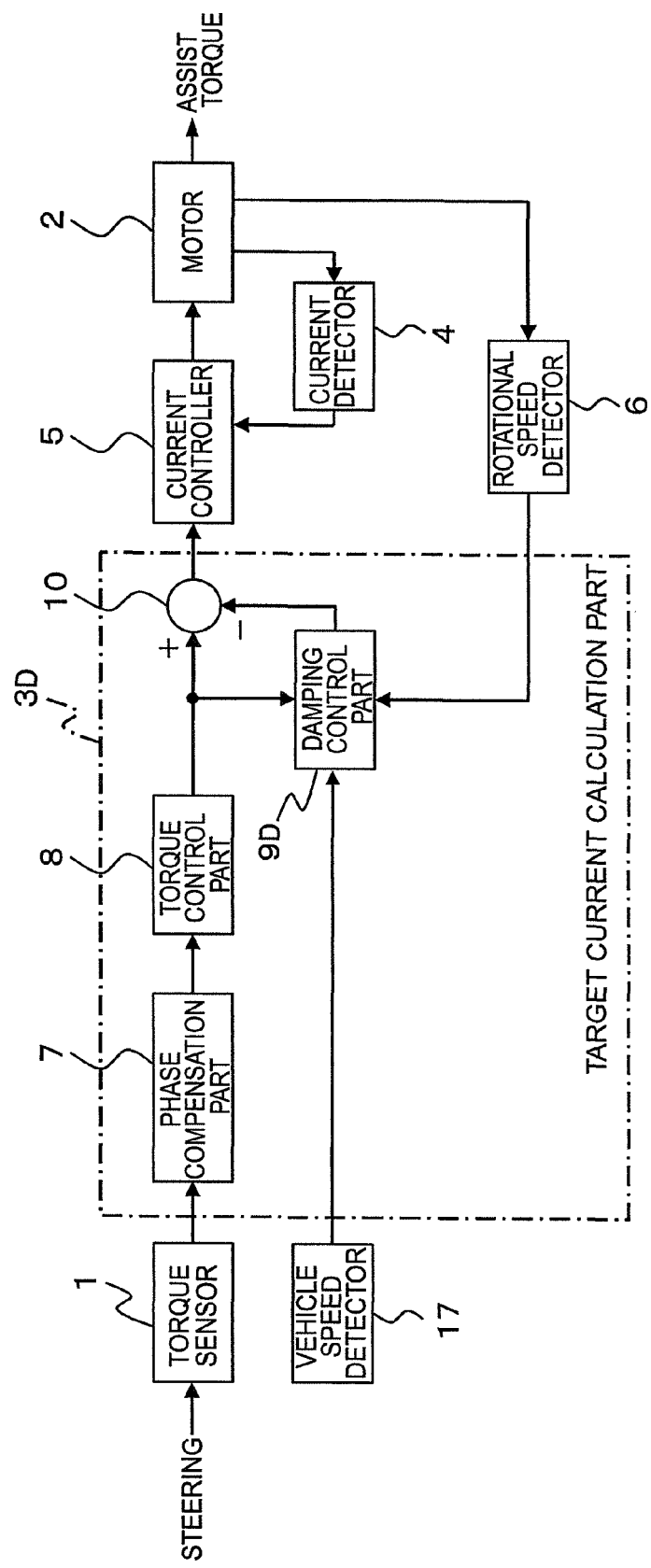
FIG. 10 is a block diagram showing an electric power steering control apparatus according to a fifth embodiment of the present invention.

FIG. 10 is a block diagram that shows an electric power steering control apparatus according to a fifth embodiment of the present invention.

In FIG. 10, this electric power steering control apparatus is provided with a vehicle speed detector 17 (a vehicle speed detection section) that detects the travel speed of a vehicle and outputs a corresponding vehicle speed signal.

In addition, this electric power steering control apparatus includes a damping control part 9D in place of the damping control part 9 shown in FIG. 1.

Here, note that a target current calculation section 3D includes the damping control part 9D.

The damping control part 9D calculates, based on an assist torque current signal, a rotational speed signal and the vehicle speed signal, a damping current for suppressing vibrations generated in a steering system of the vehicle, and outputs a corresponding damping current signal.

That is, the damping control part 9 calculates a vibration suppression current from the aforementioned assist torque current-vibration suppression current map based on the assist torque current signal, sets a damping control gain from the aforementioned rotational speed-damping control gain map based on the rotational speed signal, and calculates the damping current by multiplying the vibration suppression current by the damping control gain.

Here, the damping control part 9D reduces the damping current to "0" for instance based on the vehicle speed signal when the travel speed of the vehicle is equal to or less than a predetermined vehicle speed V, and outputs a corresponding damping current signal.

Note that the damping current is not limited to "0" if it is smaller than a value calculated from the vibration suppression current and the damping control gain.

The construction of this fifth embodiment other than the above is similar to that of the first embodiment, and a description thereof is omitted.

According to the electric power steering control apparatus of the fifth embodiment of the present invention, when the travel speed of the vehicle is equal to or less than the predetermined vehicle speed V, the damping control part 9D reduces the damping current and outputs the corresponding damping current signal.

Thus, advantageous effects similar to those in the above-mentioned first embodiment can be obtained. In addition, for example, when the vehicle is stopped (i.e., when the travel speed of the vehicle is equal to or less than the predetermined vehicle speed V), by reducing the damping current to "0" so as to stop the damping control, it is possible to decrease the steering torque without providing an unpleasant feeling to the driver further.

With the damping control parts 9 through 9D of the above-mentioned first through fifth embodiments, when the rotational speed of the motor 2 is larger than the predetermined speed R, the damping control gain is set to "1" in accordance with the rotational speed-damping control gain map shown in FIG. 2, and when the rotational speed of the motor 2 is equal to or less than the predetermined speed R, the damping control gain is set to the predetermined gain K (<1), but the present invention is not limited to this.

Figure 11:
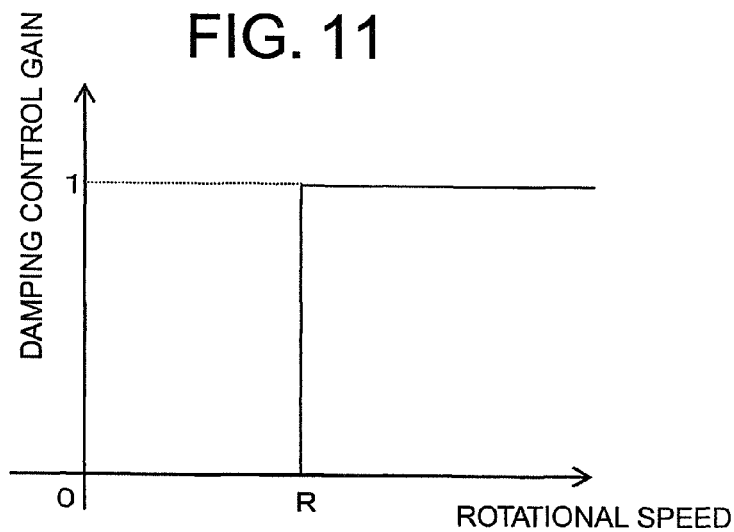
FIG. 11 is an explanatory view showing another rotational speed-damping control gain map provided in a damping control part.

Specifically, the damping control parts may be constructed to set the damping control gain in accordance with a rotational speed-damping control gain map shown in FIG. 11 in such a manner that when the rotational speed of the motor 2 is larger than the predetermined speed R, the damping control gain is set to "1", whereas when the rotational speed of the motor 2 is equal to or less than the predetermined speed R, the damping control gain is set to "0".

Figure 12:
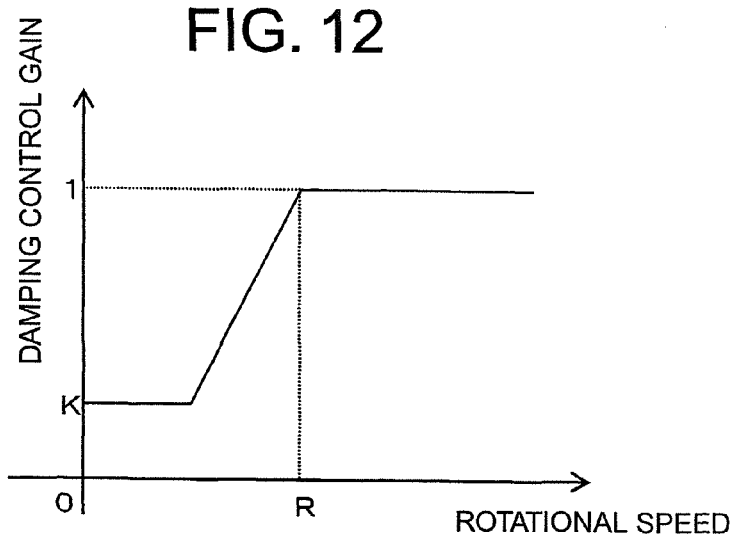
FIG. 12 is an explanatory view showing a further rotational speed-damping control gain map provided in a damping control part.

In addition, the damping control parts may be constructed to set the damping control gain in accordance with a rotational speed-damping control gain map shown in FIG. 12 in such a manner that when the rotational speed of the motor 2 is larger than the predetermined speed R, the damping control gain is set to "1", whereas when the rotational speed of the motor 2 is equal to or less than the predetermined speed R, the damping control gain is decreased linearly to the predetermined gain K (<1).

Figure 13:
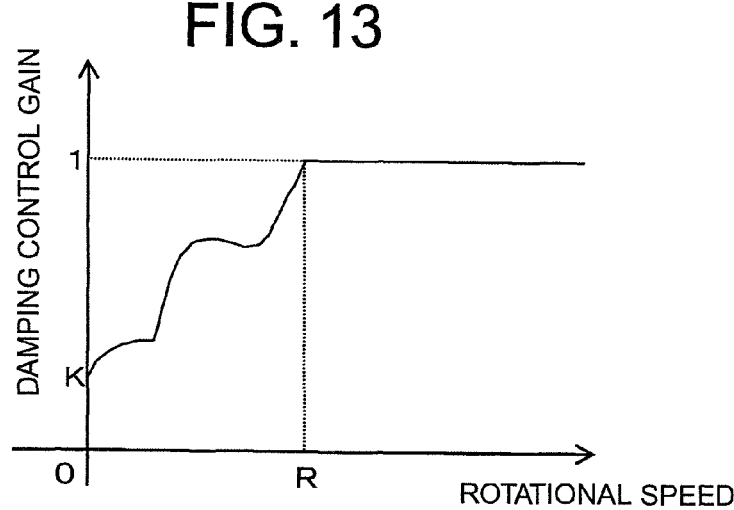
FIG. 13 is an explanatory view showing a yet further rotational speed-damping control gain map provided in a damping control part.

Further, the damping control parts may be constructed to set the damping control gain in accordance with a rotational speed-damping control gain map shown in FIG. 13 in such a manner that when the rotational speed of the motor 2 is larger than the predetermined speed R, the damping control gain is set to "1", whereas when the rotational speed of the motor 2 is equal to or less than the predetermined speed R, the damping control gain is decreased nonlinearly to the predetermined gain K (<1).

In these cases, advantageous effects similar to those of the above-mentioned first through fifth embodiments can be achieved.

While the invention has been described in terms of preferred embodiments, those skilled in the art will recognize that the invention can be practiced with modifications within the spirit and scope of the appended claims.

What is claimed is:

1. An electric power steering control apparatus comprising:
   a steering torque detection section that detects steering torque generated by a driver of a vehicle;
   a motor that generates assist torque to assist the steering torque;
   a rotational speed detection section that detects the rotational speed of the motor;

a torque control section that calculates an assist torque current corresponding to the assist torque based on the steering torque; and a damping control section that calculates a damping current to be added to the assist torque current for suppressing vibrations generated in a steering system of the vehicle;

wherein the damping control section reduces a damping control gain for calculation of the damping current when a steering wheel is in a steering holding state or in a slight steering state that occurs when the rotational speed of the motor is equal to or less than a predetermined speed and there is less movement of the steering wheel, wherein the rotational speed detection section comprises:

at least one of a current detection section and an addition section;

a voltage calculation section;

a rotational speed estimation section;

a current detection section;

a voltage detection section; and wherein the current detection section detects a motor drive current to be supplied to the motor;

the addition section calculates a target motor current to be supplied to the motor by adding the assist torque current and the damping current to each other;

the voltage calculation section calculates a target motor voltage to he impressed to the Motor;

the rotation speed estimation section estimates the rotational speed of the motor based on the target motor current or the motor target voltage, and based on the motor drive current;

the voltage detection section detects a motor drive voltage to be impressed to the motor; and the rotation speed estimation section estimates the rotational speed of the motor based on the motor drive current and the motor drive voltage.

2. The electric power steering control apparatus as set forth in claim 1, wherein the rotation speed detection section comprises:

a steering torque steering component removal section;

a motor current steering component removal section; and a rotational speed observer;

the steering torque steering component removal section removes a frequency component due to the steering operation of the driver from the steering torque, and outputs a post-removal steering torque;

the motor current steering component removal section removes a frequency component due to the steering of the driver from the motor drive current or the target motor current, and outputs a post-removal motor current; and the rotational speed observer estimates the rotational speed of the motor based on the post-removal steering torque and the post-removal motor current.

3. The electric power steering control apparatus as set forth in claim 1, wherein the rotational speed detection section comprises:

a rotational angle detection section that detects the rotational angle of the motor; and a rotational speed estimation section that estimates the rotational speed of the motor by differentiating the rotational angle of the motor.

4. The electric power steering control apparatus as set forth in claim 1, further comprising:

a vehicle speed detection section that detects the travel speed of the vehicle;

wherein the damping control section reduces the damping current when the travel speed of the vehicle is equal to or less than a predetermined speed.

5. The electric power steering control apparatus as set forth in claim 1, wherein the damping control section sets the damping control gain to zero when the rotational speed of the motor is equal to or less than a predetermined speed.

6. The electric power steering control apparatus as set forth in claim 1, wherein the damping control section immediately sets the damping control gain to a predetermined gain when the rotational speed of the motor is equal to or less than a predetermined speed.

7. The electric power steering control apparatus as set forth in claim 1, wherein the damping control section linearly reduces the damping control gain to a predetermined gain when the rotational speed of the motor is equal to or less than a predetermined speed.

8. The electric power steering control apparatus as set forth in claim 1, wherein the damping control section nonlinearly reduces the damping control gain to a predetermined gain when the rotational speed of the motor is equal to or less than a predetermined speed.

* * * * *